United States Patent [19]
Aydin et al.

[11] Patent Number: 5,468,799
[45] Date of Patent: * Nov. 21, 1995

[54] AQUEOUS POLYMER DISPERSION HAVING A BROAD PARTICLE SIZE DISTRIBUTION

[75] Inventors: Oral Aydin, Mannheim; Michael Portugall, Wachenheim; Josef Neutzner, Neustadt; Walter Maechtle, Ludwigshafen, all of Germany

[73] Assignee: BASF Aktiengesellschaft, Ludwigshafen, Germany

[*] Notice: The portion of the term of this patent subsequent to Jun. 20, 2012, has been disclaimed.

[21] Appl. No.: 220,688

[22] Filed: Mar. 31, 1994

Related U.S. Application Data

[62] Division of Ser. No. 38,864, Mar. 29, 1993, Pat. No. 5,350,787.

[30] Foreign Application Priority Data

Apr. 29, 1992 [DE] Germany .......................... 42 13 965.1

[51] Int. Cl.$^6$ .................................................. C08L 13/02
[52] U.S. Cl. ..................... 524/457; 524/458; 524/460; 524/555; 524/556; 524/558; 524/560; 524/162
[58] Field of Search ..................................... 524/457, 458, 524/460, 555, 560, 558, 556, 159, 161, 162

[56] References Cited

U.S. PATENT DOCUMENTS

| | | | |
|---|---|---|---|
| 3,424,706 | 1/1969 | Smith et al. | 524/460 |
| 4,123,403 | 10/1978 | Warner et al. | 524/558 |
| 4,322,328 | 3/1982 | Gratz et al. | 524/558 |

*Primary Examiner*—Jeffrey T. Smith
*Attorney, Agent, or Firm*—Oblon, Spivak, McClelland, Maier & Neustadt

[57] ABSTRACT

An aqueous polymer dispersion with a final solids volume concentration of at least 50% by volume is obtainable by polymerizing at least one radical polymerizable monomer by the method of free radical aqueous emulsion polymerization with the addition of an aqueous dispersion of a starting polymer.

14 Claims, No Drawings

AQUEOUS POLYMER DISPERSION HAVING A BROAD PARTICLE SIZE DISTRIBUTION

This is a division, of application Ser. No. 08/038,864, filed on Mar. 29, 1993, now U.S. Pat. No. 5,350,787.

The present invention relates to final aqueous polymer dispersions which have a solids volume concentration (solids volume=solids mass divided by solids density) of at least 50% by volume and are obtainable by polymerizing at least one radical polymerizable monomer with the addition of at least one aqueous dispersion of a starting polymer in a polymerization vessel by the method of free radical aqueous emulsion polymerization in the presence of surface active substances and free radical polymerization initiators with the proviso that a) the mass of the at least one radical polymerizable monomer relative to the total mass formed of the mass of the at least one radical polymerizable monomer and the mass of starting polymer added in the form of the at least one aqueous dispersion is from 90 to 99.5%, b) the starting polymer is present in the at least one aqueous dispersion in the form of dispersed starting polymer particles whose non-zero weight average particle diameter is equal to or less than 50 nm, c) the total number of starting polymer particles added dispersed in the form of at least one aqueous dispersion of a starting polymer is from $10^{15}$ to $10^{20}$ starting polymer particles per liter based on the volume of the final polymer dispersion, d) of the total amount of the at least one monomer to be polymerized either nothing or at most 10% by weight is introduced into the polymerization vessel as initial charge prior to the start of the free radical aqueous emulsion polymerization, e) of the total amount of the at least one aqueous dispersion of a starting polymer to be added the amount introduced into the polymerization vessel as initial charge prior to the start of the free radical aqueous emulsion polymerization is either nil or at most such that the total number of starting polymer particles introduced as initial charge is not more than 10% of the total starting polymer particles to be added in the form of the at least one aqueous dispersion, f) of the total amount of the at least one monomer to be polymerized at least 90% by weight is added to the polymerization vessel after the start of the free radical aqueous emulsion polymerization, in such a way that at any time of this addition the polymerization conversion of the monomers already added previously to the polymerization vessel including the monomers introduced into the polymerization vessel as initial charge is at least 80%, based on the total amount formed of the monomers added previously to the polymerization vessel and the monomers introduced into the polymerization vessel as initial charge, g) of the total amount of the at least one aqueous dispersion of a starting polymer to be added the proportion added to the polymerization vessel after the start of the free radical aqueous emulsion polymerization is at least such that the total number of the starting polymer particles contained in this added amount of the at least one aqueous dispersion to be added is at least 90% of the starting polymer particles to be added in total in the form of the at least one aqueous dispersion of a starting polymer and that this addition is carried out in such a way that at any time of this addition the polymerization conversion of the monomers already added previously to the polymerization vessel including the monomers introduced into the polymerization vessel as initial charge is at least 80%, based on the total amount formed of the monomers added previously to the polymerization vessel and the monomers introduced into the polymerization vessel as initial charge;

at any time after the start of the emulsion polymerization the ratio $V_e$ of the number of moles of the amount already added previously to the polymerization vessel of the at least one monomer including the proportion of the at least one monomer introduced into the polymerization vessel as initial charge to the number of moles of the starting polymer particles already added previously to the polymerization vessel in the form of the at least one aqueous dispersion of a starting polymer, standardized for the ratio of the number of moles of the total amount of the at least one monomer to be polymerized to the number of moles of the starting polymer particles to be added in total in the form of the at least one aqueous dispersion of the starting polymer, is within the range from >0 to 10;

at any time after the start of the emulsion polymerization the ratio $V_a$ of the number of moles of the starting polymer particles already added previously to the polymerization vessel in the form of the at least one aqueous dispersion of a starting polymer excluding the proportion of the at least one aqueous dispersion of a starting polymer introduced into the polymerization vessel as initial charge to the number of moles of the amount of the at least one monomer already added previously to the polymerization vessel excluding the proportion of the at least one monomer introduced into the polymerization vessel as initial charge, standardized for the ratio of the number of moles of the starting polymer particles added in total in the form of the at least one aqueous dispersion of a starting polymer to the number of moles of the amount of the at least one monomer added in total after the start of the aqueous emulsion polymerization, is within the range from 0 to 10;

on completion of the addition of the at least one monomer at most 10% of the starting polymer particles to be added in total in the form of the at least one aqueous dispersion of a starting polymer are added to the polymerization vessel;

on completion of the addition of the at least one aqueous dispersion of a starting polymer at most 30% by weight of the total amount of the at least one monomer to be polymerized is added to the polymerization vessel;

h) the final aqueous polymer dispersion contains from 1 to 5% of surface active substances, based on the total mass formed of the mass of the at least one radical polymerizable monomer and the mass of starting polymer to be added in the form of the at least one aqueous dispersion, i) of the total amount of surface active substances contained in the final polymer dispersion at most 15% by weight is introduced into the polymerization vessel as initial charge prior to the start of the free radical aqueous emulsion polymerization (aliquot A), j) of the total amount of surface active substances contained in the final polymer dispersion at least 50% by weight are already part of the at least one aqueous dispersion to be added of a starting polymer (aliquot B), k) the proportion of the total amount of surface active substances contained in total in the final polymer dispersion that is neither part of aliquot A nor part of aliquot B (namely aliquot C) is added to the polymerization vessel after the start of the free radical aqueous emulsion polymerization in such a way that at any time the total amount formed of the proportions of aliquots C and B already present in the polymerization vessel is less than 5% by weight, based on the total amount of monomers and polymer present in the polymerization vessel, and l) the total amount used of free radical polymerization initiators is 0.1 to 5% by weight, based on the total amount of the at least one monomer to be polymerized, and is added to the polymerization vessel in the course of the free radical aqueous emulsion polymerization in such a way that the free radical aqueous emulsion polymerization continues to a minimum polymerization conversion of at least 90% of the total amount of the at least one monomer to be polymerized.

The present invention further relates to the process for preparing such final aqueous polymer dispersions and to the use thereof as binders and as materials for preparing coatings and adhesive joints.

Aqueous polymer dispersions are systems comprising polymer particles dispersed as disperse phase in an aqueous dispersion medium.

Polymer solutions form polymer films as the solvent evaporates. Aqueous polymer dispersions behave the same way on evaporation of the aqueous dispersion medium, which is why aqueous polymer dispersions find varied use as binders, for example for paints or for leather coatings.

Aqueous polymer dispersions having a high polymer content are of particular advantage in that, on the one hand, their relatively lower proportion of aqueous dispersion medium reduces the energy required for evaporating it, for example for film formation or for preparing polymer powders, and, on the other, the useful polymer can be stored and transported using a relatively smaller amount of aqueous phase as carrier medium.

However, there is a disadvantage in that, as the volume concentration of the polymer increases (U.S. Pat. No. 4,130,523), there are problems with the preparation of aqueous polymer dispersions. For instance, the flow resistance (the viscosity) increases and this increased viscosity makes it difficult not only to remove the heat of reaction but also to process the aqueous dispersion; secondly, there is an increasing tendency for the dispersed polymer particles to aggregate for reasons of thermodynamic stability. The resulting flocs [a) microflocs or specks; not normally removable by conventional filtration; b) macroflocs or coagulum; normally removable by conventional filtration] interfere in particular with the film forming of the aqueous polymer dispersions and are therefore generally undesirable.

According to studies about the flow resistance of aqueous polymer dispersions, those having a broad size distribution (polydispersity) of the dispersed polymer particles for the same solids content generally have a lower flow resistance than those with a narrow size distribution (which are in the extreme case monodispersed). Furthermore, coarse aqueous polymer dispersions have a lower flow resistance than fine aqueous polymer dispersions, given the same solids content.

EP-A-129 699 discloses a process for preparing an aqueous polymer dispersion wherein unsaturated monomers are polymerized in a conventional manner in a polymerization vessel by the method of free radical aqueous emulsion polymerization with the addition of an aqueous dispersion of a starting polymer such that the addition of the aqueous dispersion of the starting polymer must be concluded before 40% by weight of the total monomers to be polymerized have copolymerized and must not start before the average particle size of the emulsion polymer formed in the course of the polymerization of the monomers is twice that of the aqueous dispersion of the starting polymer. In fact, the aqueous dispersion of the starting polymer is preferably not added over a prolonged period but all at once.

The disadvantages of the aqueous polymer dispersions thus obtainable are that their flow resistance is not fully satisfactory above a solids volume concentration of 50% by volume and that, according to the embodiment examples, the solids volume concentration is limited to values below 65% by volume.

U.S. Pat. No. 4,130,523 concerns a process for preparing aqueous polymer dispersions wherein aqueous polymer dispersion already formed in the course of the polymerization process is continuously removed from the reaction zone, stored and later reintroduced into the reaction zone as a kind of starting polymer dispersion. A disadvantage of this process is that it is unsuitable for industrial implementation.

U.S. Pat. No. 3,424,706 concerns a process for preparing aqueous dispersions of polymers containing at least 70–97% by weight of vinylidene chloride as copolymerized units, wherein the polymerization of the monomers is effected with the addition of an aqueous dispersion of a starting polymer. The said reference teaches inter alia mixing the monomers to be polymerized and the aqueous dispersion of the starting polymer with one another and adding this mixture to the initial charge comprising part of the polymerization batch.

The disadvantage with the process of U.S. Pat. No. 3,424,706 is that it is restricted to monomer mixtures consisting chiefly of vinylidene chloride. Moreover, according to the illustrative embodiments, the aqueous polymer dispersions obtainable by this process are unsatisfactory not only as regards the flow resistance above a solids volume concentration of 50% by volume but also as regards the upper limit for the solids volume concentration attainable in a still satisfactorily flowable state.

It is an object of the present invention to make available aqueous polymer dispersions that are obtainable in a simple, industrially suitable, reproducible manner not restricted to specific monomers with an increased solids volume concentration but a reduced flow resistance and reduced floc content.

We have found that this object is achieved by the final aqueous polymer dispersions defined at the beginning.

Remarkably, the subject-matter of the invention is not restricted to the free radical aqueous emulsion polymerization of monomer mixtures composed chiefly or exclusively of vinyl and/or vinylidene halides, despite the generally known fact that the development of the disperse phase in the case of monomers other than vinyl and/or vinylidene halides is a significantly more complex phenomenon.

The process of the invention is therefore particularly suitable for, inter alia, monoethylenically unsaturated monomers such as olefins, for example ethylene, aromatic vinyl monomers such as styrene, $\alpha$-methylstyrene, o-chlorostyrene or vinyltoluenes, vinyl and vinylidene halides such as vinyl and vinylidene chloride, esters of vinyl alcohol and monocarboxylic acids having from 1 to 18 carbon atoms, such as vinyl acetate, vinyl propionate, vinyl-n-butyrate, vinyl laurate and vinyl stearate, esters of $\alpha,\beta$-monoethylenically unsaturated mono- and dicarboxylic acids preferably of from 3 to 6 carbon atoms, such as, in particular, acrylic acid, methacrylic acid, maleic acid, fumaric acid and itaconic acid, with alkanols in general of from 1 to 12, preferably of from 1 to 8, in particular of from 1 to 4, carbon atoms, such as, in particular, methyl, ethyl, n-butyl, isobutyl and 2-ethylhexyl acrylate and methacrylate, dimethyl maleate or n-butyl maleate, nitriles of α,β-monoethylenically unsaturated carboxylic acids such as acrylonitrile and also $C_{4-8}$-conjugated dienes such as 1,3-butadiene and isoprene. The monomers mentioned generally form the principal monomers which, based on the total amount of the monomers to be polymerized by the method of free radical aqueous emulsion polymerization, normally account for a proportion of more than 50% by weight. Monomers which polymerized by themselves normally form homopolymers that possess enhanced water solubility are normally included in the polymer only as modifying monomers, in amounts, based on the total amount of monomers to be polymerized, of less than 50% by weight, in general from 0.5 to 20, preferably from 1 to 10, % by weight.

Examples of monomers of this type are α,β-monoethylenically unsaturated mono- and dicarboxylic acids of from 3 to 6 carbon atoms and amides thereof, e.g. acrylic acid, methacrylic acid, maleic acid, fumaric acid, itaconic acid, acrylamide and methacrylamide, also vinylsulfonic acid and water-soluble salts thereof, and also N-vinylpyrrolidone. Monomers which customarily enhance the internal strength of the films formed from the final aqueous polymer dispersion are in general likewise included in the polymer only in minor amounts, usually from 0.5 to 10% by weight, based on the total amount of monomers to be polymerized. Monomers of this type normally have an epoxy, hydroxyl, N-methylol, carbonyl or at least two nonconjugated ethylenically unsaturated double bonds. Examples thereof are N-alkylolamides of α,β-monoethylenically unsaturated carboxylic acids of from 3 to 10 carbon atoms or esters thereof with alcohols of from 1 to 4 carbon atoms, of which N-methylolacrylamide and N-methylolmethacrylamide are particularly preferred, divinyl monomers, divinylidene monomers and also dialkenyl monomers. Particularly suitable instances of these are the diesters of dihyrdic alcohols with α,β-monoethylenically unsaturated monocarboxylic acids, of which in turn acrylic and methacrylic acid are preferred. Examples of such monomers having two nonconjugated ethylenically unsaturated double bonds are alkylene glycol diacrylates and dimethacrylates such as ethylene glycol diacrylate, 1,3-butylene glycol diacrylate, 1,4-butylene glycol diacrylate, propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate. As well as monomers having unsaturated double bonds it is possible for minor amounts, customarily from 0.01 to 2% by weight, based on the monomers to be polymerized, of molecular weight regulators, such as tertdodecyl mercaptan to be included in the polymer. It is preferable to add such substances to the polymerization zone mixed with the monomers to be polymerized.

Suitable surface active substances include not only the protective colloids customarily used for carrying out free radical aqueous emulsion polymerizations but also emulsifiers. Examples of suitable protective colloids are polyvinyl alcohols, cellulose derivatives and vinylpyrrolidone-containing copolymers. A detailed description of further suitable protective colloids may be found in Houben-Weyl, Methoden der organischen Chemie, Volume XIV/1, Makromolekulare Stoffe, Georg Thieme Verlag, Stuttgart, 1961, pages 411 to 420. It is of course also possible to use mixtures of emulsifiers and/or protective colloids. Preferably, the surface active substances used are exclusively emulsifiers whose relative molecular weights are customarily below 1000, in contradistinction to protective colloids. They can be anionic, cationic or nonionic in nature. Of course, if mixtures of surface active substances are used, the individual components must be compatible with one another, which can be verified beforehand by means of a few preliminary experiments if there is any doubt. In general, anionic emulsifiers are compatible with one another and with nonionic emulsifiers. The same is true of cationic emulsifiers, while anionic and cationic emulsifiers are usually incompatible with one another. Examples of customary emulsifiers are ethoxylated mono-, di- and trialkylphenols (EO degree: 3–50, alkyl radical: $C_4$–$C_9$), ethoxylated fatty alcohols (EO degree: 3–50, alkyl radical: $C_8$–$C_{36}$), and also alkali metal and ammonium salts of alkyl sulfates (alkyl radical: $C_8$–$C_{12}$), of sulfuric monoesters of ethoxylated alkanols (EO degree: 4–30, alkyl radical: $C_{12}$–$C_{18}$), and ethoxylated alkylphenols (EO degree: 3–50, alkyl radical: $C_4$–$C_9$), of alkylsulfonic acids (alkyl radical: $C_{12}$–$C_{18}$) and of alkylarylsulfonic acids (alkyl radical: $C_9$–$C_{18}$). Further suitable emulsifiers may be found in Houben-Weyl, Methoden der organischen Chemie, Volume XIV/1, Makromolekulare Stoffe, Georg Thieme Verlag, Stuttgart, 1961, pages 192 to 208.

Particularly suitable surface active substances are compounds of the general formula I

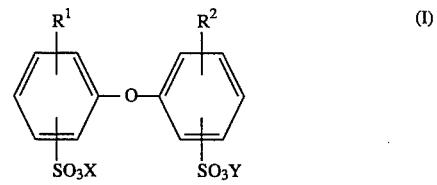

where $R^1$ and $R^2$ are each hydrogen or $CC_4$–$C_{24}$-alkyl but are not both hydrogen, and X and Y are each an alkali metal or ammonium ion. In the formula I, $R^1$ and $R^2$ are each preferably linear or branched alkyl radicals of from 6 to 18 carbon atoms or hydrogen, in particular of 6, 12 and 16 carbon atoms, but $R^1$ and $R^2$ must not both be hydrogen. X and Y are each preferably sodium, potassium or ammonium ions, of which sodium is particularly preferred. Of particular advantage are compounds I in which X and Y are each sodium, $R^1$ is a branched alkyl radical of 12 carbon atoms and $R^2$ is hydrogen or $R^1$. It is common to employ technical grade mixtures containing from 50 to 90% by weight of the monoalkylated product, for example Dowfax® 2A1 (trademark of the Dow Chemical Company). In the process of the invention compounds I are preferably used as the sole surface active substances. Compounds I are generally known, for example from U.S. Pat. No. 4,269,749, and are commercially available. It is advantageous for the final aqueous polymer dispersion of the invention to contain from 1 to 3% by weight of surface active substances, based on the mass of the final polymer.

Suitable free radical polymerization initiators are all those which are capable of initiating a free radical aqueous emulsion polymerization. This includes not only peroxides, for example alkali metal peroxydisulfates, but also azo compounds. Preference is given to using combined systems composed of at least one organic reducing agent and at least one peroxide and/or hydroperoxide, e.g. tert-butyl hydroperoxide and the sodium salt of hydroxymethanesulfinic acid or hydrogen peroxide and ascorbic acid, and very particular preference is given to combined systems which in addition contain a small amount of a metal compound that is soluble in the polymerization medium and whose metallic component can exist in a plurality of valence states, for example ascorbic acid/iron(II) sulfate/hydrogen peroxide, although in the case of ascorbic acid it is also common to employ the sodium salt of hydroxymethanesulfinic acid, sodium sulfite, sodium hydrogensulfite or sodium disulfite and instead of hydrogen peroxide it is common to employ tert-butyl hydroperoxide or alkali metal peroxodisulfates and/or ammonium peroxodisulfate. Instead of a water-soluble iron(II) salt it is common to employ a combination of water-soluble Fe/V salts. The amount of free radical initiator system used is preferably from 0.1 to 2% by weight, based on the total amount of monomers to be polymerized.

The manner of addition of the free radical initiator system to the polymerization vessel in the course of the free radical aqueous emulsion polymerization of the invention is rather of minor importance for the success of the process of the invention. The initiator system can not only be introduced into the polymerization vessel in its entirety as part of the initial charge but also be added continuously or stepwise in the course of the free radical aqueous emulsion polymerization at the rate of its consumption. The choice in a particular case depends in the usual fashion not only on the chemical nature of the initiator system but also on the polymerization temperature.

The polymerization pressure and the polymerization temperature are likewise of rather minor importance. In general, the temperature employed will be between room temperature and 100° C., preferably within the range from 50° to 95° C. The employment of superatmospheric or reduced pressure is possible, so that the polymerization temperature may also exceed 100 ° C. and may in fact be as high as 130° C. Volatile monomers such as ethylene, butadiene or vinyl chloride are preferably polymerized under superatmospheric pressure.

The monomers mentioned by way of example as suitable for the free radical aqueous emulsion polymerization of the invention are suitable not only for use as constituents of the monomer mixture to be polymerized, but also, in the same way as the free radical polymerization initiators and molecular weight regulators recommended for the free radical aqueous emulsion polymerization of the invention, for use as constituents of the starting polymer, although the monomer, regulator and initiator composition for the aqueous dispersion of the starting polymer can be not only congruent with but also different from the monomer mixture to be polymerized according to the invention. This applies mutatis mutandis necessarily also to the surface active substances to be used for preparing the aqueous dispersion of the starting polymer, since in the process of the invention at least 50, preferably at least 60, % by weight of the total amount of surface active substances contained in the final polymer dispersion of the invention must already be part of the aqueous dispersion of the starting polymer to be added. This amount of surface active substances need not of course have already been used in its entirety in the free radical aqueous emulsion polymerization for preparing the aqueous dispersion of the starting polymer. On the contrary, some of it may also be added subsequently to the already fully polymerized aqueous dispersion of the starting polymer.

Aqueous dispersions to be added according to the invention of a starting polymer in which the starting polymer is present in the form of dispersed starting polymer particles having a non-zero weight average particle diameter of less than or equal to 50 nm, preferably from 10 to 40, particularly preferably from 25 to 35, nm are obtainable in a conventional manner. Appropriate teaching may be found for example in Houben-Weyl, Methoden der organischen Chemie, Volume E 20, part I, Makromolekulare Stoffe, Georg Thieme Verlag, Stuttgart, 1987, pages 248 to 268. If the solids content is to be a usual 20–40% by weight, the starting dispersions are obtainable in a particularly simple manner, for example by mixing together the aqueous phase (which may contain for example ammonia or $NaHCO_3$ for pH control), the monomers, the free radical initiators (normally from 0.1 to 5% by weight, based on the amount of starting monomers to be polymerized), and surface active substances (customarily from 10 to 50% by weight, based on the starting monomers to be polymerized) at a low temperature and heating the mixture to the polymerization temperature and polymerizing it (the particle size generally decreases with increasing surface active substance). As regards the polymerization temperature and pressure the earlier statements about the process of the invention apply. Of course, some of the aqueous dispersion of a starting polymer to be added according to the invention can be prepared immediately beforehand in the same polymerization vessel in which the actual process of the invention is to be carried out. In fact there can be a smooth transition between the two emulsion polymerization processes, in particular when this initial charge portion of the aqueous dispersion of the starting polymer is prepared employing the stream addition method, in which part of the polymerization batch is introduced as initial charge and heated to the polymerization temperature and the remainder is then added to the ongoing polymerization in a stream or spatially separate streams.

The number of dispersed starting polymer particles present in the aqueous dispersion of the starting polymer is obtainable in a simple manner to good approximation by assuming a spherical shape for the particles, determining the number average particle radius in a conventional manner (for example by photon correlation spectroscopy by means of dynamic light scattering or an analytical ultracentrifuge; the latter is also suitable in particular for determining the weight average particle diameter and was employed here; cf. W. Mächtle, Makromolekulare Chemie 185 (1984), 1025–1039), then multiplying the polymer content of the aqueous dispersion of the starting polymer (determined by drying and weighing, minus the amount of emulsifier used) by three, and dividing the resulting product by the product of four times the density of the starting polymer, the ratio of the circumference of the circle to the diameter of the circle, and the third power of the number average particle radius. The process of the invention is preferable when the total number of starting polymer particles added dispersed in the form of at least one aqueous dispersion of a starting polymer is from $10^{17}$ to $10^{19}$ starting polymer particles per liter based on the volume of the final polymer dispersion. It is also preferable for aqueous dispersions of starting polymers to have a broad particle size distribution. Of course, in the course of the aqueous free radical emulsion polymerization of the invention it is possible for there to be a change in the composition not only of the monomers to be added to the polymerization vessel after the polymerization has started but also of the aqueous dispersion of the starting polymer to be added to the polymerization vessel after the polymerization has started. Furthermore, the addition can take place not only stepwise but also continuously or by the gradient method. In general, a continuous mode of addition is preferred.

In this way it is possible to obtain special structures for the particles of the final polymer, as described for example in Kast, Makromol. Chem. Suppl. 10/11 (1985), 447–461. Preferred classes of final polymers are those polymerized to an extent of from 70 to 100% by weight from esters of acrylic and/or methacrylic-acid with alkanols of from 1 to 12 carbon atoms and/or styrene, or to an extent of from 70 to 100% by weight from styrene and/or butadiene, or to an extent of from 70 to 100% by weight from vinyl chloride and/or vinylidene chloride, of which the class of the acrylates is particularly preferred and preferably includes the following monomer compositions:

95–99% by weight of at least one ester of acrylic and/or methacrylic acid with alkanols of from 1 to 8 carbon atoms, and 1–5% by weight of acrylic acid, methacrylic acid or a mixture thereof.

The process of the invention is preferably carried out by initially charging the polymerization vessel with that part of the polymerization batch which, apart from a possible polymerization initiator content, advantageously comprises only water and surface active substances and in addition particularly advantageously with part of the total amount of the at lease one aqueous dispersion of a starting polymer to be added in the course of the process, and it is a proposal of the invention that the total amount of surface active substance included in the initial charge shall be at most 15% by weight, based on the total amount of surface active substances contained in the final polymer dispersion (ie. the aliquots A and B appearing in paragraphs i) to k) of the definition of the final aqueous polymer dispersion of the invention given at the beginning may have a common part). The initial charge is then heated to the polymerization temperature and the remainder of the polymerization batch added to the ongoing polymerization. If the initial charge is free of initiator and monomers the polymerization can be initiated for example by starting the addition of monomers and initiator to the hot initial charge at the polymerization temperature at the same time. The free radical polymerization initiators are advantageously added in a spatially separate stream, and their addition advantageously takes place essentially synchronously with the addition of the monomers to be polymerized. The monomers to be polymerized can be added not only by themselves but also preemulsified in aqueous phase. If final aqueous polymer dispersions having a particularly high solids volume concentration are to be obtained, it is preferable for the monomers no be polymerized to be added by themselves.

It is advantageous when the addition of monomers to be polymerized and of the at least one aqueous dispersion of a starting polymer after the start of the free radical aqueous emulsion polymerization of the invention is effected in such a way that at any time of this addition the polymerization conversion of the monomers already added previously to the polymerization vessel including the monomers introduced into the polymerization vessel as initial charge is at least 90%, with particular advantage at least 95%, based on the total amount formed of the monomers added previously to the polymerization vessel and the monomers introduced into the polymerization vessel as initial charge. It is preferable when the addition of the at least one aqueous dispersion of a starting polymer ends not later than the end of the addition of the monomers to be polymerized, and it is particularly advantageous when, after the addition of the at least one aqueous dispersion of a starting polymer has ended, up to 20% by weight of the total amount of the at Least one monomer to be polymerized is further added to the polymerization vessel.

If, after the start of the free radical aqueous emulsion polymerization of the invention, the polymerization vessel is also charged with surface active substances that are not part of the at least one aqueous dispersion of the starting polymer, then this addition is advantageously effected in such a way that at any time the total amount of surface active substances to be used, formed of the aliquots C and B already present in the polymerization vessel, is less than 3% by weight, based on the total amount of monomers and polymer present in the polymerization vessel. Preferably the addition takes place synchronously with the monomer addition. In the extreme case up to 50% by weight of the total amount of surface active substances contained in the final aqueous polymer dispersion can be added after the actual polymerization process has ended for the purpose of subsequent stabilization of the final aqueous polymer dispersion. Preferably, after the free radical aqueous emulsion polymerization of the invention has started, the polymerization vessel is not charged with any surface active substances that are not part of the at least one aqueous dispersion of the starting polymer.

After the aqueous emulsion polymerization of the invention has started the addition of the at least one aqueous dispersion of a starting polymer and of the monomers to be polymerized is advantageously effected relative to one another in such a way that the ratio $V_e$ standardized in paragraph g) of the definition of the final polymer dispersion of the invention given at the beginning is at any time within the range >0 to 6 and the ratio $V_a$ standardized in the same paragraph g) is within the range from 0 to 7. Furthermore, the addition of starting polymer particles and monomers after the free radical aqueous emulsion polymerization of the invention has started is preferably effected continuously.

On completion of the actual polymerization process the mixture is preferably stirred for some additional hours while the polymerization temperature is maintained. This may be followed by customary measures for residual monomer removal, for setting a different pH or other methods for post-stabilization.

Of course, the various possible, generally spatially separate, feed streams can be mixed with one another immediately before entry into the polymerization vessel.

The free radical aqueous emulsion polymerization of the invention generally gives final aqueous polymer dispersions which have a very wide particle size distribution which has all the following particle size distributions:

5–25% by weight of the final polymer $\leq$ 200 nm

15–40% by weight of the final polymer $\leq$ 400 nm

35–75% by weight of the final polymer $\leq$ 600 nm

45–90% by weight of the final polymer $\leq$ 800 nm

100% by weight of the final polymer $\leq$ 1600 nm

This specific particle size distribution is presumably responsible for the reduced flow resistance of the final aqueous polymer dispersions of the invention, which normally have Newtonian flow characteristics. The particle size distribution was determined in an analytical ultracentrifuge using the coupling PSD technique (see W. Mächtle, Angewandte Makromolekulare Chemie 162 (1988), 35–42 (No. 2735)). Below a solids volume concentration of 50% by volume the effect of the particle size distribution on the flow resistance decreases progressively.

The final aqueous polymer dispersions of the invention are generally obtained as described in an industrially readily implementable manner with solids volume concentrations of up to 75% by volume with fully satisfactory reproducibility and no flocs. The final aqueous polymer dispersions of the invention show their advantageous properties particularly markedly at solids volume concentrations above 65% by volume, which is why such final polymer dispersions are preferred. They are generally suitable for use as binders and as materials for preparing coatings and adhesive joints, for which purpose they may have additionally mixed into them in a conventional manner assistants such as film forming aids, fillers or plasticizers.

EXAMPLES

1) Preparation of aqueous dispersions DS1 and DS2 of a starting polymer

DS1: a mixture of
  65.4 kg of water,
  25 kg of n-butyl acrylate and
  22.25 kg of a 45% strength by weight aqueous solution of the surface active substance corresponding to Dowfax 2A1
was admixed at room temperature first with a solution of 0.0625 kg of ascorbic acid and 0.005 kg of iron(II) sulfate in 2 kg of water and then in the course of 3 minutes with a mixture of 2 kg of water and 0.65 kg of a 30% strength by weight aqueous hydrogen peroxide solution. The temperature was then maintained at 52° C. for 1 h. Thereafter the mixture was cooled down to room temperature and following the addition of 0.05 kg of ascorbic acid in 1 kg of water additionally stirred for 2 h.

The resulting aqueous dispersion of a starting polymer had a solids content of 30.2% by weight, a weight average particle diameter $d_w$ of 32 nm and a particle concentration of $1.7 \times 10^{19}$ particles/kg.

S2: a mixture of
  1800 g of water,
  445 g of a 45% strength by weight aqueous solution of the surface active substance corresponding to the Dowfax 2A1,
  10 g of a 25% strength by weight aqueous ammonia solution,
  495 g of n-butyl acrylate, and
  5 g of acrylic acid,
was heated to 80° C. and admixed with 25 g of sodium peroxodisulfate added in one portion. The temperature was then maintained at 80° C. for 1 h and the mixture was then cooled down to 25° C.

The resulting aqueous dispersion of a starting polymer had a solids content of 26% by weight, a weight average particle diameter $d_w$ of 35 nm and a particle concentration of $1.1 \times 10^{19}$ particles/kg.

2) Preparation of various final aqueous polymer dispersions DF1 to DF4 according to the invention DF1: a mixture of
  150 g of water,
  22 g of a 20% strength by weight aqueous solution of the surface active substance corresponding to Dowfax 2A1,
  and 11 g of aqueous dispersion DS1 from 1)
in a polymerization vessel was heated with stirring to 85° C. and then continuously admixed over 5 h at 85° C. with stream II. The start for the addition of stream II was also the start for the continuous addition of stream I, the time-course of which was as follows:
  4% by weight within 40 min,
  then 8% by weight within 40 min,
  then 88% by weight within 200 min.

80 minutes after the start of the addition of stream II an additional 549 g of aqueous dispersion DS1 from 1) was started to be added continuously according to the following schedule:
  33.4% by weight within 80 min,
  then 66.6% by weight within 120 min.

Stream I:
  1345.2 g of n-butyl acrylate
  889.2 g of methyl methacrylate
  46.5 g of methacrylic acid Stream II:
  160 g of water
  10 g of sodium peroxodisulfate On completion of the addition of stream II the reaction mixture was held at 85° C. for a further hour.

The product obtained was an essentially floc-free final aqueous polymer dispersion (2.93 liters) having a solids volume concentration of 67.6% by volume (75.4% by weight), a dynamic viscosity of 460 mPa.s determined as per DIN 53019 at 23° C. and a shear gradient of 487 $s^{-1}$, and the following particle size distribution:
  7% by weight ≤ 200 nm
  18% by weight ≤ 400 nm
  55% by weight ≤ 600 nm
  85% by weight ≤ 800 nm
  95% by weight ≤ 1000 nm
  100% by weight ≤ 1200 nm. DF2: a mixture of
  160 g of water,
  11.2 g of a 20% strength by weight aqueous solution of the surface active substance corresponding to Dowfax 2A1,
  and 11 g of aqueous dispersion DS1 from 1)
in a polymerization vessel was heated with stirring to 85° C. and then continuously admixed over 5 h at 85° C. with stream II. The start for the addition of stream II was also the start for the continuous addition of stream I, the time-course of which was as follows:
  4% by weight within 40 min,
  then 8% by weight within 40 min,
  then 88% by weight within 200 min.

80 minutes after the start of the addition of stream II an additional 549 g of aqueous dispersion DS1 from 1) was started to be added continuously according to the following schedule:
  26% by weight within 80 min,
  then 54% by weight within 60 min.
  then 20% by weight within 60 min.

Stream I:
  1915.2 g of n-butyl acrylate
  114 g of ethyl acrylate
  114 g of 2-ethylhexyl acrylate
  114 g of methyl methacrylate
  22.8 g of acrylic acid
  3.4 g of tert-dodecyl mercaptan Stream II:
  160 g of water
  10 g of sodium peroxodisulfate On completion of the addition of stream II the reaction mixture was held at 85° C. for a further hour.

The product obtained was an essentially floc-free final aqueous polymer dispersion (3.04 liters) having a solids volume concentration of 69.4% by volume (75.3% by weight), a dynamic viscosity of 375 mPa.s determined as per DIN 53019 at 23° C. and a shear gradient of 487 s$^{-1}$, and the following particle size distribution:

20% by weight≦200 nm

40% by weight≦400 nm

72% by weight≦600 nm

90% by weight≦800 nm

100% by weight≦1000 nm.

DF3: A polymerization vessel was charged with 175 g of water which were then heated to 85° C. Then, starting at the same time, the following streams were added at 85° C. according to the following schedules:

Stream I:

2257.2 g of n-butyl acrylate 22.8 g of acrylic acid

2% by weight in 20 min, then 4% by weight in 20 min, then 8% by weight in 20 min, then 86% by weight in 180 min.

Stream II:

667 g of aqueous dispersion DS2 from 1)

5% by weight in 60 min, then 10% by weight in 60 min, then 85% by weight in 120 min.

Stream III:

79.7 g of water 6.0 g of sodium peroxodisulfate

20% by weight in 5 min, then 80% by weight in 115 min.

On completion of the addition of streams I and II the reaction mixture was held at 85° C. for a further hour and then cooled down.

The result obtained was an essentially floc-free final aqueous polymer dispersion (2.9 liters) having a solids volume concentration of 69.5% by volume (75.3% by weight), a dynamic viscosity of 430 mPa.s determined as per DIN 53019 at 23° C. and a shear gradient of 487 s$^{-1}$, and the following particle size distribution:

16% by weight≦200 nm

30% by weight≦400 nm

35% by weight≦600 nm

45% by weight≦800 nm

60% by weight≦1000 nm

75% by weight≦1200 nm

90% by weight≦1400 nm

100% by weight≦1600 nm

DF4: As for DF3, but the stream addition schedules were as follows:

Stream I:

1% by weight in 20 min, then 2% by weight in 20 min, then 4% by weight in 20 min, then 93% by weight in 300 min.

Stream II:

1% by weight in 5 min, then 99% by weight in 295 min.

Stream III:

5% by weight in 60 min, then 5% by weight in 60 min, then 90% by weight in 240 min.

On completion of the addition of streams I and III the reaction mixture was held at 85° C. for a further hour and then cooled down.

The result obtained was an essentially floc-free final aqueous polymer dispersion (2.92 liters) having a solids volume concentration of 70.3% by volume (75.9% by weight), a dynamic viscosity of 510 mPa.s determined as per DIN 53019 at 23° C. and a shear gradient of 487 s$^{-1}$, and the following particle size distribution:

23% by weight≦200 nm

35% by weight≦400 nm

65% by weight≦600 nm

90% by weight≦800 nm

95% by weight≦1000 nm

100% by weight≦1200 nm

We claim:

1. An aqueous polymer dispersion whose solids volume concentration is ≦50% by volume and which has all the following polymer particle size distributions:

from 5–25% by weight of the polymer≦200 nm from 15–40% by weight of the polymer≦400 nm from 35–75% by weight of the polymer≦600 nm from 45–90% by weight of the polymer≦800 nm 100% by weight of the polymer≦1600 nm, the polymer being formed from free radically polymerizable monomers.

2. An aqueous polymer dispersion as claimed in claim 1, wherein said aqueous polymer dispersion has a solids volume concentration of ≧65% by volume.

3. An aqueous polymer dispersion as claimed in claim 1, wherein said aqueous polymer dispersion comprises a polymer comprising:

from 95–99% by weight of a $C_{1-8}$ alkanol ester of acrylic acid, a $C_{1-8}$ alkanol ester of methacrylic acid or a mixture thereof, and from 1–5% by weight of acrylic acid, methacrylic acid or a mixture thereof.

4. An aqueous polymer dispersion as claimed in claim 3, wherein said aqueous polymer dispersion has a solids volume concentration of ≧65% by volume.

5. An aqueous polymer dispersion as claimed in claim 1, further comprising at least one surface active substance of the formula I

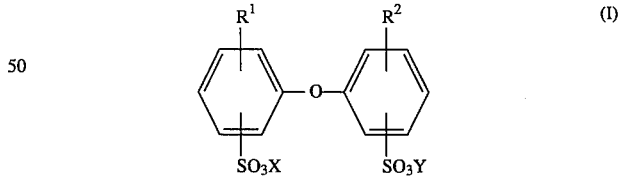

where $R^1$ and $R^2$ are each hydrogen or $C_{4-24}$-alkyl, but are not both hydrogen, and X and Y are each an alkali metal or ammonium ion.

6. An aqueous polymer dispersion as claimed in claim 5, wherein said aqueous polymer dispersion has a solids volume concentration of ≧65% by volume.

7. An aqueous polymer dispersion as claimed in claim 1, wherein said aqueous polymer dispersion comprises a polymer comprising from 70 to 100% by weight of a $C_{1-12}$ alkanol ester of acrylic acid, a $C_{1-12}$ alkanol ester of methacrylic acid, styrene or a mixture thereof.

8. An aqueous polymer dispersion as claimed in claim 1, wherein said aqueous polymer dispersion comprises a polymer comprising from 70 to 100% by weight of styrene, butadiene or a mixture of butadiene and styrene.

9. An aqueous polymer dispersion as claimed in claim 1, wherein said aqueous polymer dispersion comprises a polymer comprising from 70 to 100% by weight of vinyl chloride, vinylidene chloride or a mixture thereof.

10. An aqueous polymer dispersion as claimed in claim 7, wherein said aqueous polymer dispersion has a solids volume concentration of $\geq 65\%$ by volume.

11. An aqueous polymer dispersion as claimed in claim 8, wherein said aqueous polymer dispersion has a solids volume concentration of $\geq 65\%$ by volume.

12. An aqueous polymer dispersion as claimed in claim 9, wherein said aqueous polymer dispersion has a solids volume concentration of $\geq 65\%$ by volume.

13. An aqueous polymer dispersion whose solids concentration is $\geq 75.3\%$ by weight and $\leq 75\%$ by volume and which has all the following polymer particle size distributions:

from 5–25% by weight of the polymer $\leq 200$ nm from 15–40% by weight of the polymer $\leq 400$ nm from 35–75% by weight of the polymer $\leq 600$ nm from 45–90% by weight of the polymer $\leq 800$ nm 100% by weight of the polymer $\leq 1600$ nm, the polymer being formed from free radically polymerizable monomers.

14. An aqueous polymer dispersion whose solids volume concentration is $\geq 65\%$ by volume and which has all the following polymer particle size distributions:

from 5–25% by weight of the polymer $\leq 200$ nm from 15–40% by weight of the polymer $\leq 400$ nm from 35–75% by weight of the polymer $\leq 600$ nm from 45–90% by weight of the polymer $\leq 800$ nm 100% by weight of the polymer $\leq 1600$ nm, the polymer being formed from free radically polymerizable monomers selected from the group consisting of acrylic acid, methacrylic acid, methyl acrylate, methyl methacrylate, ethyl acrylate, ethyl methacrylate, acrylonitrile, vinyl halides, vinylidene halides, vinyl acetate, vinyl propionate, acrylamide, methacrylamide and vinylsulfonic acid and water soluble salts thereof.

* * * * *